US009952950B1

(12) United States Patent
Spongr

(10) Patent No.: US 9,952,950 B1
(45) Date of Patent: Apr. 24, 2018

(54) DATA MANAGEMENT IN RAID ENVIRONMENT

(71) Applicant: Western Digital Technologies, Inc., Irvine, CA (US)

(72) Inventor: John Spongr, Rancho Santa Margarita, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 121 days.

(21) Appl. No.: 14/741,157

(22) Filed: Jun. 16, 2015

Related U.S. Application Data

(60) Provisional application No. 62/047,581, filed on Sep. 8, 2014, provisional application No. 62/059,671, filed on Oct. 3, 2014.

(51) Int. Cl.
*G06F 12/02* (2006.01)
*G06F 11/20* (2006.01)
*G06F 11/14* (2006.01)

(52) U.S. Cl.
CPC ...... *G06F 11/2069* (2013.01); *G06F 11/1451* (2013.01); *G06F 11/2058* (2013.01); *G06F 11/2094* (2013.01); *G06F 2201/84* (2013.01)

(58) Field of Classification Search
None
See application file for complete search history.

(56) References Cited

U.S. PATENT DOCUMENTS

| 5,724,539 A | * | 3/1998 | Riggle | G06F 3/0613 370/468 |
| 5,774,714 A | * | 6/1998 | Thapar | G11B 27/105 348/E7.073 |
| 6,018,789 A | | 1/2000 | Sokolov et al. | |
| 6,065,095 A | | 5/2000 | Sokolov et al. | |
| 6,078,452 A | | 6/2000 | Kittilson et al. | |
| 6,081,447 A | | 6/2000 | Lofgren et al. | |
| 6,092,149 A | | 7/2000 | Hicken et al. | |
| 6,092,150 A | | 7/2000 | Sokolov et al. | |
| 6,094,707 A | | 7/2000 | Sokolov et al. | |
| 6,105,104 A | | 8/2000 | Guttmann et al. | |
| 6,111,717 A | | 8/2000 | Cloke et al. | |
| 6,115,788 A | * | 9/2000 | Thowe | G06F 3/0613 711/111 |
| 6,145,052 A | | 11/2000 | Howe et al. | |

(Continued)

OTHER PUBLICATIONS

John Spongr, et al., U.S. Appl. No. 14/741,287, filed Jun. 16, 2015, 48 pages.

*Primary Examiner* — Duc Doan
(74) *Attorney, Agent, or Firm* — Barry IP Law

(57) ABSTRACT

A data storage system includes a plurality of Data Storage Devices (DSDs) that each includes at least one disk for storing data. Data is received for storage in a data stripe across the plurality of DSDs with each DSD of the plurality of DSDs storing a different portion of the data stripe. A strip size is determined for each portion of the data stripe based on a radial location where the portion of the data stripe will be stored on the at least one disk of its respective DSD. The data stripe is stored across the plurality of DSDs with each portion of the data stripe arranged in a radial location on the at least one disk of its respective DSD so that, when the data stripe is accessed, the radial locations of access in the plurality of DSDs progress in the same radial direction.

23 Claims, 16 Drawing Sheets

(56) References Cited

U.S. PATENT DOCUMENTS

| | | |
|---|---|---|
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,251 B1 * | 4/2001 | Nemoto ............ G06F 11/1076 711/114 |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,591,338 B1 | 7/2003 | Horst et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |

(56) References Cited

U.S. PATENT DOCUMENTS

| | | |
|---|---|---|
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |

(56) References Cited

U.S. PATENT DOCUMENTS

| | | |
|---|---|---|
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2002/0095546 A1* | 7/2002 | Dimitri ............ G11B 20/1217 711/112 |
| 2009/0113702 A1 | 5/2009 | Hogg |
| 2010/0306468 A1 | 12/2010 | Shionoya |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

* cited by examiner

| Data Stripe | DSD 102 Strip Size | DSD 104 Strip Size | DSD 106 Strip Size | DSD 108 Strip Size | DSD 110 Strip Size | Total Stripe Width |
|---|---|---|---|---|---|---|
| 0 | 124 KB | 109 KB | 94 KB | 79 KB | 64 KB | 470 KB |
| 1 | 109 KB | 94 KB | 79 KB | 64 KB | 124 KB | 470 KB |
| 2 | 94 KB | 79 KB | 64 KB | 124 KB | 109 KB | 470 KB |
| 3 | 79 KB | 64 KB | 124 KB | 109 KB | 94 KB | 470 KB |
| 4 | 64 KB | 124 KB | 109 KB | 94 KB | 79 KB | 470 KB |

FIG. 5A

| Stripe Crossover Point | 5.1TB DSD 102 | 5.5TB DSD 104 | 4.9TB DSD 106 | 5.3TB DSD 108 | 5.4TB DSD 110 | 5.6TB DSD 112 | 5.2TB DSD 114 | 5.4TB DSD 116 | 5.1TB DSD 118 |
|---|---|---|---|---|---|---|---|---|---|
| — | 19.47% | 20.99% | 18.70% | 20.23% | 20.61% | — | — | — | — |
| 2 | 24.52% | 26.44% | 23.56% | 25.48% | — | — | — | — | — |
| 3 | 19.32% | 20.83% | 18.56% | 20.08% | — | 21.21% | — | — | — |
| 4 | — | — | — | — | — | — | 33.12% | 34.40% | 32.48% |

FIG. 13

DATA MANAGEMENT IN RAID ENVIRONMENT

RELATED APPLICATIONS

This application claims the benefit of U.S. Provisional Application No. 62/047,581, filed on Sep. 8, 2014, which is hereby incorporated by reference in its entirety. This application also claims the benefit of U.S. Provisional Application No. 62/059,671, filed on Oct. 3, 2014, which is hereby incorporated by reference in its entirety.

BACKGROUND

Data Storage Devices (DSDs) are often used to record data onto or to reproduce data from storage media. DSDs can include different types of storage media, such as solid-state memory (e.g., flash memory) or a rotating magnetic disk. With the increased need for data storage, more data is being stored in data storage systems including multiple DSDs rather than a single DSD.

One example of a data storage system with multiple DSDs can include a Redundant Array of Independent Disks (RAID) where data is stored across multiple DSDs. In such systems, data can be stored in a data stripe across the DSDs with each DSD including a portion of the data stripe in what is referred to as a data strip.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 5A is a table illustrating the assignment of varying strip sizes to different DSDs according to an embodiment.

FIG. 13 is a table illustrating the determination of different weights for different DSDs according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Overview of Example System Environment

Figure 1:
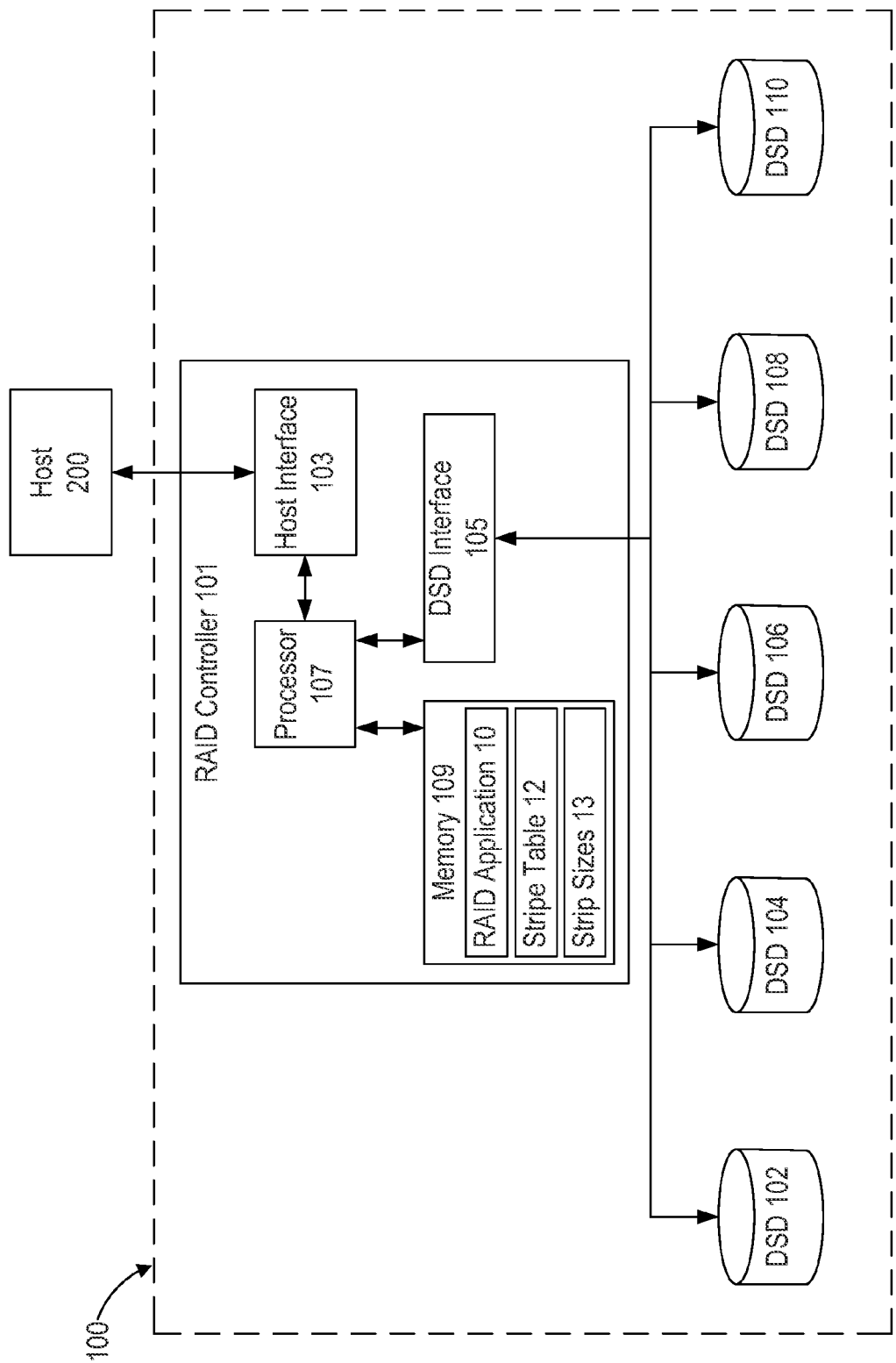
FIG. 1 is a block diagram depicting a data storage system including Data Storage Devices (DSDs) arranged as a Redundant Array of Independent Disks (RAID) according to an embodiment.

FIG. 1 is a block diagram depicting data storage system 100 including Data Storage Devices (DSDs) 102, 104, 106, 108, and 110 arranged as a Redundant Array of Independent Disks (RAID) according to an embodiment. Each of DSDs 102, 104, 106, 108, and 110 can include storage media such as rotating magnetic disks and/or solid-state memory for storing data.

Data storage system 100 is in communication with host 200 which can use data storage system 100 as, for example, a data center storage system or a cloud-based storage system. In this regard, data storage system 100 may be a stand-alone system or part of a network such as a local area network, wide area network, or the Internet.

As shown in FIG. 1, data storage system 100 includes RAID controller 101, which allocates data among DSDs 102, 104, 106, 108, and 110. RAID controller 101 interfaces with DSDs 102, 104, 106, 108, and 110 via DSD interface 105, which may interface according to a standard such as, for example, Peripheral Component Interconnect Express (PCIe), Serial Advanced Technology Attachment (SATA), Small Computer System Interface (SCSI), or Serial Attached SCSI (SAS).

RAID controller 101 also interfaces with host 200 via host interface 103, which may interface with host 200 according to a standard such as, for example, Ethernet. RAID controller 101 and host 200 may be remotely located from each other via a network. Similarly, RAID controller 101 and one or more of DSDs 102, 104, 106, 108, and 110 need not be physically in the same location. For example, one or more of DSDs 102, 104, 106, 108, and 110 can be located in a different room, building, or city than other DSDs or RAID controller 101.

Those of ordinary skill in the art will appreciate that data storage system 100 can include more or less than those components shown in FIG. 1 and that the disclosed processes can be implemented in other environments In the example environment of FIG. 1, RAID controller 101 includes processor 107 which can be implemented using one or more processors for executing instructions such as a microcontroller, a Digital Signal Processor (DSP), an Application Specific Integrated Circuit (ASIC), a Field Programmable Gate Array (FPGA), hard-wired logic, analog circuitry and/or a combination thereof. A processor of RAID controller 101 as referenced hereinafter can be one or more of the foregoing processors or another processor configured to perform functions described herein.

RAID controller 101 also includes memory 109 that can comprise a computer readable medium of various types of volatile or non-volatile Random Access Memory (RAM) that provide information stored in memory 109 to processor 107 during execution of instructions in software programs such as RAID application 10. Memory 109 also stores data that is used by processor 107 such as stripe table 12 and strip sizes 13.

RAID application 10 configures RAID controller 101 to communicate with each of DSDs 102, 104, 106, 108, and 110 to direct the storage of data among the DSDs and to access data from the DSDs. As will be appreciated by those of ordinary skill in the art, RAID controller 101 may use a particular storage scheme or RAID level (e.g., RAID 0, 1, 5, 6, 10) in determining which data to store on which DSD. The various storage schemes may provide for data redundancy and/or improved performance in accessing data from system 100.

Stripe table 12 provides location information for data stripes that are stored across the DSDs. A data stripe includes data that has been divided into portions that are stored in different DSDs. In one implementation, stripe table 12 can include logical addresses (e.g., Logical Block Addresses (LBAs)) indicating a starting location for the portions of data stripes stored across the DSDs. An example of stripe table 12 is discussed in more detail below with reference to FIG. 5B.

Strip sizes 13 provide the data sizes assigned to each DSD for the portions of the data stripes that are stored across the DSDs. As discussed in more detail below, the present disclosure allows the strip size or portion size assigned to each DSD to vary.

Figure 2:
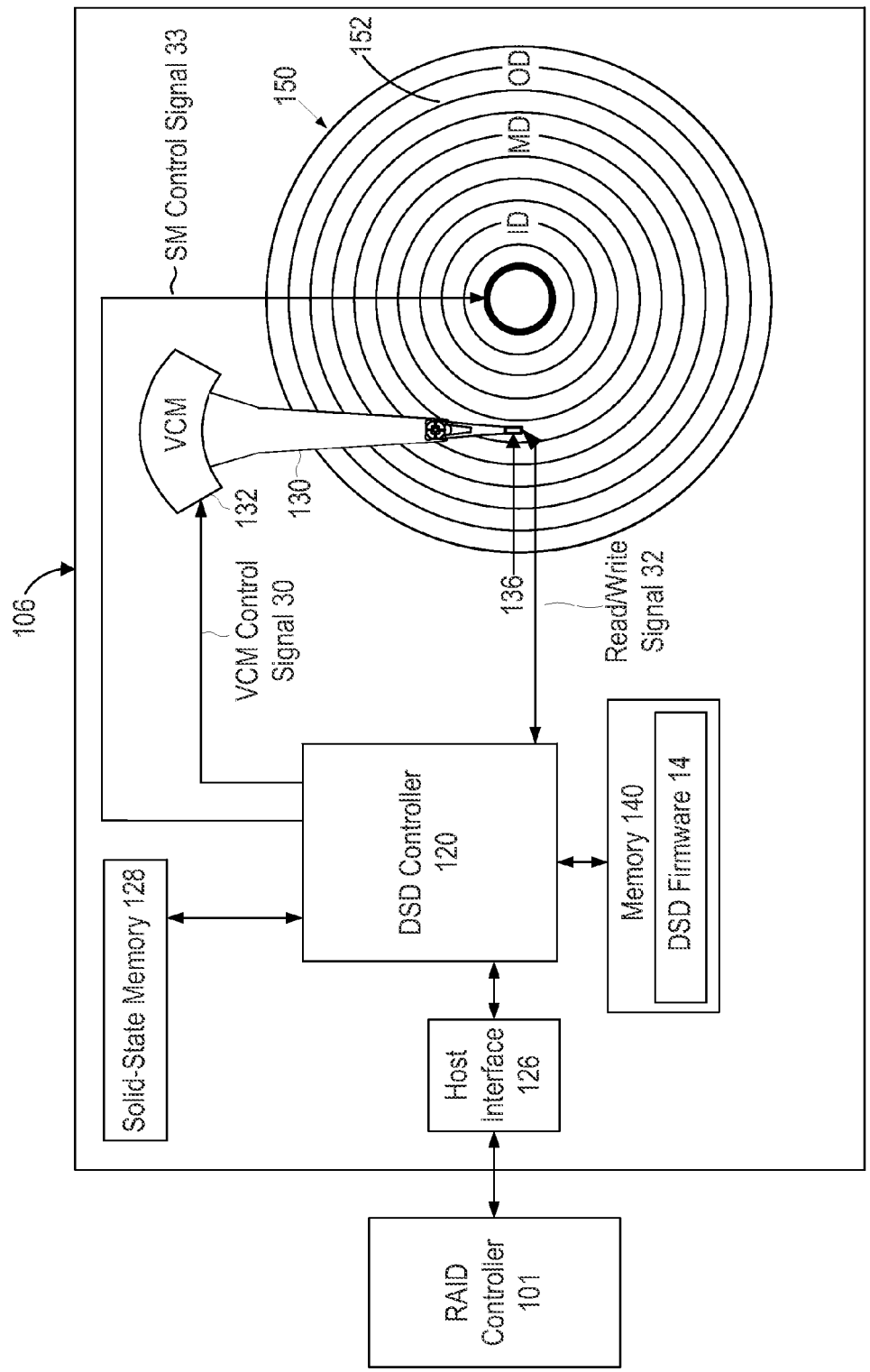
FIG. 2 is a block diagram depicting a DSD of FIG. 1 according to an embodiment.

FIG. 2 is a block diagram depicting an example of DSD 106 of FIG. 1 according to an embodiment. In the embodiment of FIG. 2, DSD 106 is a Solid-State Hybrid Drive (SSHD) with a first storage media including magnetic recording media (e.g., disks in disk pack 150) and a second storage media including a solid-state media (e.g., solid-state memory 128). In other embodiments, each of disk pack 150 or solid-state memory 128 may be replaced by multiple HDDs or multiple Solid-State Drives (SSDs), respectively, so that DSD 106 includes pools of HDDs and/or SSDs. In addition, DSD 106 in other embodiments can include different types of recording media or may only include solid-state memory 128 or disk pack 150.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

DSD 106 includes DSD controller 120 which includes circuitry such as one or more processors for executing instructions and can include a microcontroller, a DSP, an ASIC, an FPGA, hard-wired logic, analog circuitry and/or a combination thereof. In one implementation, DSD controller 120 can include a system on a chip (SoC). In one embodiment, an SSD controller may be utilized that operates in conjunction with DSD controller 120 for controlling operation of solid-state memory 128.

Host interface 126 is configured to interface DSD 106 with RAID controller 101 and may interface according to a standard such as, for example, PCIe, SATA, or SAS. In a non-RAID environment, DSD 106 may communicate with a host, such as a host computer, instead of RAID controller 101 using host interface 126. As will be appreciated by those of ordinary skill in the art, host interface 126 can be included as part of controller 120. Although FIGS. 1 and 2 depict the co-location of RAID controller 101 and DSD 106, in other embodiments the two need not be physically co-located. In such embodiments, DSD 106 may be located remotely from RAID controller 101 and connected to RAID controller 101 via a network interface.

In the example of FIG. 2, the first memory of DSD 106 includes rotating magnetic disks arranged in disk pack 150 which is rotated by a spindle motor (not shown). DSD 106 also includes Head Stack Assembly (HSA) 136 connected to the distal end of actuator 130 which is rotated by Voice Coil Motor (VCM) 132 to position HSA 136 in relation to disk pack 150. DSD controller 120 can include servo control circuitry (not shown) to control the position of HSA 136 and the rotation of disk pack 150 using VCM control signal 30 and SM control signal 33, respectively.

Disk pack 150 comprises multiple disks that are radially aligned or stacked so as to rotate about a spindle motor. Each disk in disk pack 150 includes a number of radially spaced, concentric tracks 152 for storing data. As shown in FIG. 2, each disk surface in disk pack 150 has an Outer Diameter (OD) portion, a Middle Diameter (MD) portion, and an Inner Diameter (ID) portion. HSA 136 includes multiple heads each arranged to read data from and write data to a corresponding surface of a disk in disk pack 150.

In some implementations, some or all of tracks 152 may overlap as a result of Shingled Magnetic Recording (SMR). SMR can provide a way of increasing the amount of data that can be stored in a given area on a disk by increasing the number of Tracks Per Inch (TPI). SMR increases TPI by using a relatively wide shingle write head in HSA 136 to overlap tracks like roof shingles. The non-overlapping portion then serves as a narrow track that can be read by a narrower read head. In other implementations, tracks 152 may be written using Conventional Magnetic Recording (CMR) such that the tracks do not overlap.

In the example of FIG. 2, DSD 106 also includes memory 140. In some implementations, memory 140 can be a volatile memory such as Dynamic Random Access Memory (DRAM) with a copy of DSD firmware 14 stored in a Non-Volatile Memory (NVM) such as in disk pack 150 or solid-state memory 128. Data stored in memory 140 can include data read from NVMs (which may include disk pack 150 and solid-state memory 128), data to be written to NVMs, instructions loaded from DSD firmware 14 for execution by DSD controller 120, and/or data used in executing DSD firmware 14. In this regard, DSD controller 120 can execute DSD firmware 14 to control operation of DSD 106.

In operation, host interface 126 receives read and write commands from a host or from RAID controller 101 via host interface 126 for reading data from and writing data to NVMs such as disk pack 150 and solid-state memory 128. In response to a write command, DSD controller 120 may buffer the data to be written in memory 140.

For data to be written to disk pack 150, a read/write channel (not shown) of DSD controller 120 may then encode the buffered data into write signal 32 which is provided to a head of HSA 136 for magnetically writing data to a disk surface of disk pack 150.

In response to a read command for data stored on a disk surface of disk pack 150, DSD controller 120 controls a head of HSA 136 to magnetically read data stored on the disk surface and to send the read data as read signal 32. A read/write channel of DSD controller 120 can then decode and buffer the data in memory 140 for transmission to a host or to RAID controller 101 via host interface 126.

For data to be stored in solid-state memory 128, DSD controller 120 receives data from host interface 126 and may buffer the data in memory 140. In one implementation, the data is then encoded into charge values for charging cells (not shown) of solid-state memory 128 to store the data.

In response to a read command for data stored in solid-state memory 128, DSD controller 120 in one implementation reads current values for cells in solid-state memory 128 and decodes the current values into data that can be transferred or copied to a host or to RAID controller 101. Such data may be buffered by DSD controller 120 before transferring or copying the data to a host or to RAID controller 101 via host interface 126.

Data Striping Examples for Improved Throughput

Figure 3:
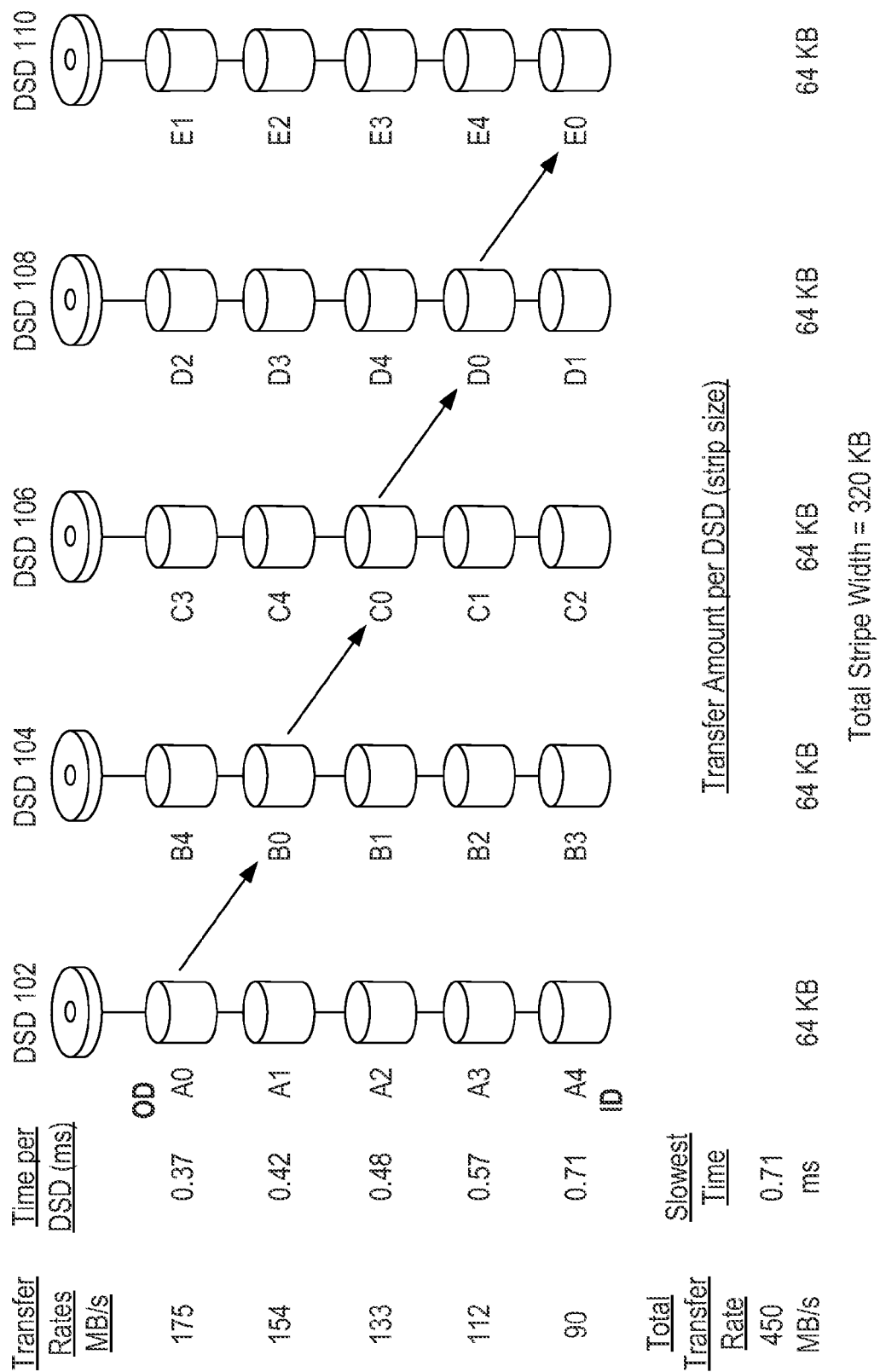
FIG. 3 is a conceptual diagram providing an example of a static strip size for each DSD according to an embodiment.

FIG. 3 is a conceptual diagram providing an example of a static strip size for each DSD in a speed banded arrangement according to an embodiment. In the example of FIG. 3, each DSD stores an equally sized portion or data strip of a data stripe. As shown at the bottom of FIG. 3, each DSD stores a 64 KB portion of a data stripe for a total data stripe width or size of 320 KB (i.e., 64 KB×5 DSDs).

The 64 KB portions or strips are stored in a speed banded arrangement across the DSDs so that the different data stripes stored across the DSDs can be accessed in approximately the same amount of time. The ability to access data stripes in approximately the same amount of time can allow for a more constant throughput which can be useful for certain applications such as video or other streaming applications. In such cases, a more consistent throughput also allows better tuning of other factors in a system such as buffer sizes, signaling, or timeouts.

Due to the varying track circumferences across a disk radius, tracks that are located in an OD portion of a disk surface are longer than tracks located in an ID portion of the disk surface. This results in a faster data transfer rate for tracks located toward the OD than for tracks located toward the ID since the time for the disk to complete one revolution of the disk is the same for all of tracks on the disk surface. To accomplish a more consistent throughput or data transfer rate for different data stripes, the 64 KB strips in FIG. 3 are located in different radial portions on the disk surfaces of the DSDs in what are referred to as speed bands that balance the varying data transfer rates of the different disk locations.

In addition, since the radial locations for the portions of a particular data stripe follow a pattern across the DSDs, each portion of the data stripe is accessed in the same radial direction (i.e., OD toward ID or ID toward OD) in the speed bands. By arranging the radial locations of access so that they progress in the same radial direction, it is ordinarily possible to more efficiently access data across the DSDs by reducing the amount of reverse seeking in an opposite radial direction. This uniform direction of access can also better take advantage of a track skew so that data can be read quicker when moving from one track to the next in the same radial direction. Such track skews circumferentially offset the beginning locations of adjacent tracks to account for the time it takes a head to travel from one track to the next so as to not miss the start of the next track in the adjacent track.

In the example of FIG. 3, DSDs 102, 104, 106, 108, and 110 store five data stripes with a first data stripe including portions or data strips A0, B0, C0, D0, and E0. A second data stripe includes portions A1, B1, C1, D1, and E1, and a third data stripe includes portions A2, B2, C2, D2, and E2. A fourth data stripe includes portions A3, B3, C3, D3, and E3, and a fifth data stripe includes portions A4, B4, C4, D4, and E4. In other implementations, data storage system 100 can store a different number of data stripes such as 100 data stripes rather than five data stripes.

Each data stripe in FIG. 3 is arranged to have different radial locations for its portions stored on different DSDs from an OD portion toward an ID portion. As a result, the overall time to access each of the data stripes is approximately the same since the different data transfer rates are balanced by storing the portions for each data stripe at different radial locations. The radial locations of access in the DSDs are shown in FIG. 3 as progressing in the same radial direction (e.g., from an OD location toward an ID location) with the arrows in FIG. 3 for the first data stripe going from A0 in DSD 102 toward E0 in DSD 110.

The left side of FIG. 3 provides the data transfer rates in MB/s for each radial location with 175 MB/s for the OD portion to 90 MB/s for the ID portion. The total data transfer rate for the data stripe is the sum of the data transfer rates for the individual DSDs, or 450 MB/s. Using a fixed strip size of 64 KB, the time for accessing the 64 KB data strip by location is provided to the right of the data transfer rates. As shown in FIG. 3, the fastest access time is at the OD portion with 0.37 ms and the slowest access time is at the ID portion with 0.71 ms. Since the DSDs can operate in parallel, the overall access time for the data stripes of FIG. 3 is therefore the slowest time to access a data strip, or 0.71 ms. Although the arrangement of FIG. 3 allows for a more constant throughput of data, the arrangement of FIG. 4 discussed below increases the overall data transfer rate for the data stripes by varying the strip sizes based on the radial location of the data strip.

Figure 4:
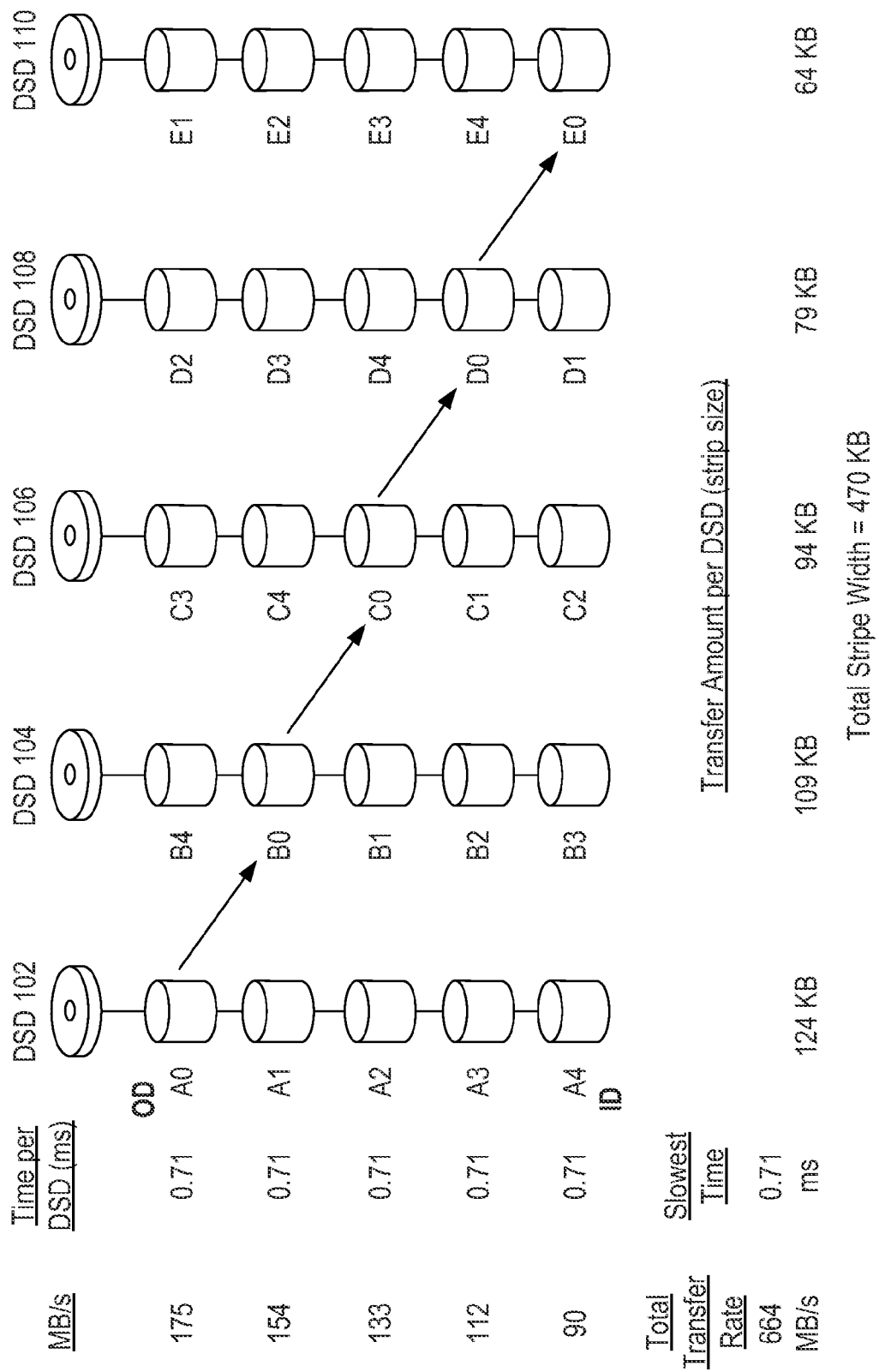
FIG. 4 is a conceptual diagram providing an example of a varying strip size for each DSD according to an embodiment.

The example of FIG. 4 is similar to the example of FIG. 3 in that the data stripes are speed banded by storing portions of the data stripes at different radial locations across the DSDs. In addition, each portion of the data stripe is arranged in a radial location so that when the data stripe is accessed, the radial locations of access in the DSDs progress in the same radial direction as in the example of FIG. 3. However, the arrangement of FIG. 4 differs from that of FIG. 3 in that the sizes of each portion or data strip within the data stripe vary depending on the radial location.

As shown in FIG. 4, the amount of data transferred for each DSD (i.e., the strip size) varies from 64 KB for an ID portion of the data stripe to 124 KB for an OD portion of the data stripe. In the case of the first data stripe including portions A0, B0, C0, D0, and E0, the OD diameter portion A0 has a strip size of 124 KB and the ID portion E0 has a strip size of 64 KB. As a result of these varying strip sizes, the time to access the data strips is approximately the same for each of the DSDs, which is the slowest time from the example of FIG. 3 of 0.71 ms. In other words, the strip size is set for each portion based on its radial location so that each portion can be completely read by its respective DSD in approximately the same amount of time.

The overall amount of data transferred for the data stripe is then increased from the example of FIG. 3 due to the larger data strips located away from the ID location. Since the total access time for the data stripe is still limited by the slowest access time of 0.71 ms, the total data transfer rate is increased because more data is transferred in the same amount of time. In this regard, the total data transfer rate in FIG. 4 has increased to 664 MB/s from 450 MB/s in FIG. 3. In addition, the total size or width of the data stripe has increased to 470 KB in FIG. 4 from a stripe width of 320 KB in FIG. 3.

FIG. 5A is a table illustrating the assignment of varying strip sizes to different DSDs as shown in FIG. 4. In the example of FIG. 5A, each of data stripes 0, 1, 2, 3, and 4 include a 124 KB strip, a 109 KB strip, a 94 KB strip, a 79 KB strip, and a 64 KB strip to form a combined data stripe of 470 KB. These varying strip sizes are staggered across the DSDs or offset from one DSD to the next based on the radial locations of access progressing in the same radial direction across the DSDs.

Although the strip sizes making up the data stripes vary in the example of FIGS. 4 and 5A, the overall size or stripe width of the data stripes remain the same at 470 KB. This can facilitate a consistent throughput or data transfer rate among the different data stripes while increasing the data transfer rate when compared to data stripes that have a static or fixed strip size.

Figure 5B:
FIG. 5B is an example of a stripe table indicating starting addresses for different portions of data stripes from the table of FIG. 5A according to an embodiment.

FIG. 5B is an example of stripe table 12 that is stored in memory 109 of RAID controller 101 according to an embodiment. Stripe table 12 can include at least one address for each portion of a data stripe to identify the portion and to associate the portion with the DSD storing the portion. In some implementations, processor 107 can set up stripe table 12 when executing RAID application 10 during an initialization process of data storage system 100. In such an implementation, the addresses used in stripe table 12 can be based on information collected from the DSDs concerning the addresses available for storing data strips. Processor 107 of RAID controller 101 can then use stripe table 12 when writing or reading data stripes stored across the DSDs of data storage system 100.

In the example of FIG. 5B, stripe table 12 indicates starting addresses in terms of a starting LBA for different portions of data stripes from the table of FIG. 5A. Other embodiments may use different information for identifying data strips such as an address range for a particular data strip or another indication of which DSD stores the data strip.

In FIG. 5B, a starting address for a strip is calculated by multiplying a previous strip size by a sector size of 1,024 bytes and adding the result to the starting address for the previous data strip. For example, the starting address for the data strip stored on DSD 104 for data stripe 0 is calculated by multiplying 1,024 bytes by the previous strip size for DSD 102 of 124 KB and adding this product to a starting address of 0 for the previous data strip. This calculation is similar for each strip in the data stripe. Other implementations may use a different calculation for determining a starting address for a data strip, such as using a sector size other than 1,024 bytes.

The end LBA column in FIG. 5B is not part of stripe table 12, but is provided for illustration purposes to more clearly show the incrementing of the addresses for the start of the next data stripe stored on DSD 102. In this regard, the starting address for each data stripe indicates a beginning location of the data stripe. The starting addresses for each data stripe after the first data stripe 0 are offset from the starting address of the previous data stripe by a predetermined address offset that is based on the number of data stripes stored across the DSDs.

In the example of FIG. 5B, the address offset is 481,281 such that the beginning location of each data stripe is offset from the beginning location of the previous data stripe by 481,281. This offset is determined by dividing the total number of addresses available for the data stripes by the number of data stripes and multiplying this result by a drive ID or drive number. In the example of FIG. 5B, the offset is determined by dividing the total number of 2,406,403 LBAs by five data stripes to yield 481,281 when rounded to the nearest whole number. The starting address of each data stripe on DSD 102 is then determined by adding this offset to the starting address of the previous data stripe. As appreciated by those of ordinary skill in the art, the specific addresses or ways of determining starting addresses may differ in other implementations.

Although the data stripes of FIG. 5B all start on DSD 102, other implementations may include data stripes that start on different DSDs. In one such example, data stripe 0 may start on DSD 102 while data stripe 1 starts on DSD 104. Despite starting on different DSDs, each of the data stripes in such an example would be the same overall size and have approximately the same data transfer rate since the sizes of the data strips making up each data stripe would vary across the DSDs depending on the radial locations of the data strips.

Figure 6:
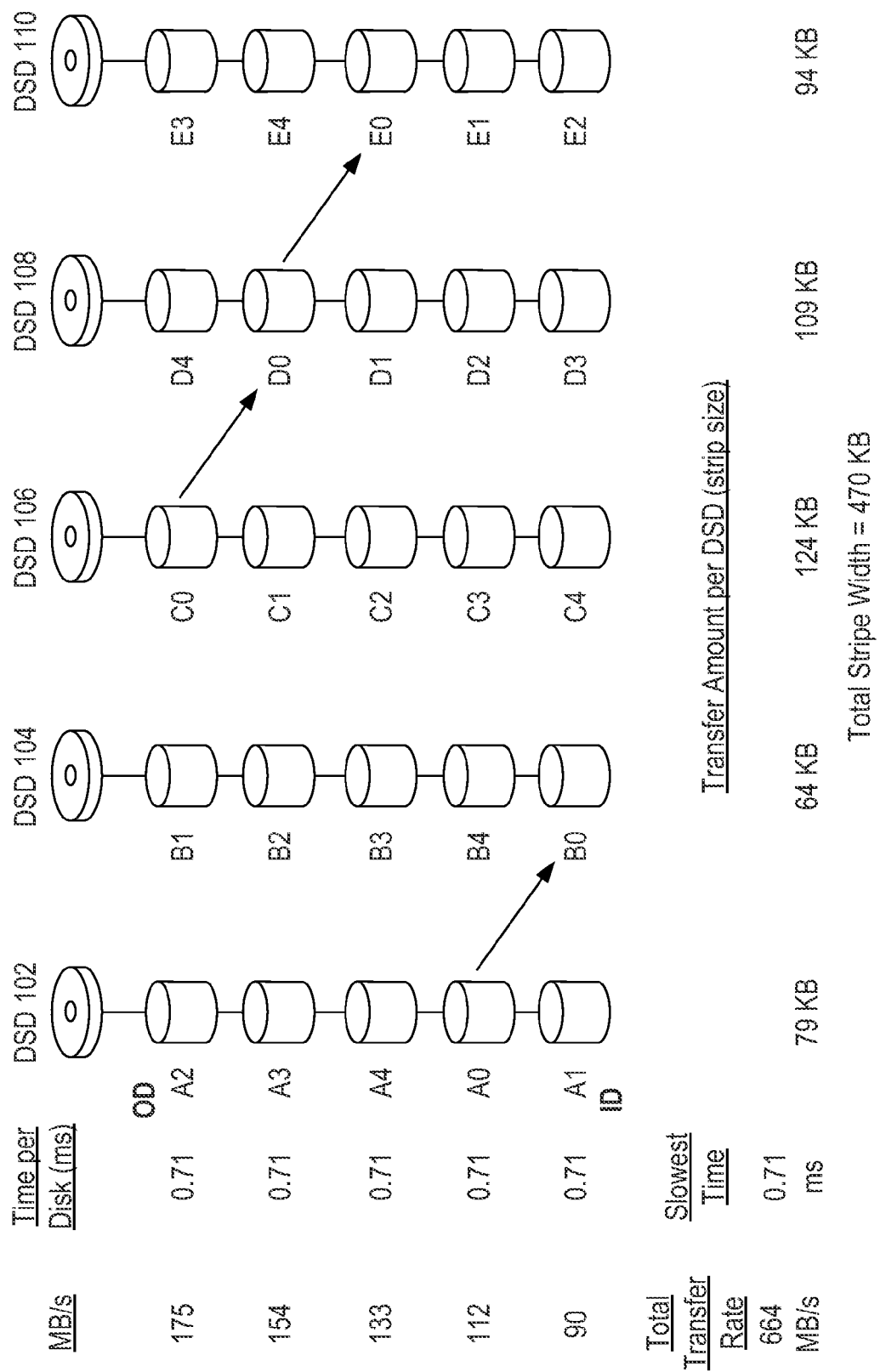
FIG. 6 is a conceptual diagram providing another example of a varying strip size for each DSD according to an embodiment.

FIG. 6 provides another example of a varying strip size for each DSD according to an embodiment. Unlike the example of FIG. 4, the first data stripe in FIG. 6 does not begin at an OD location. As shown in FIG. 4, the first data stripe including data strips A0, B0, C0, D0, and E0, begins on DSD 102 at a radial location closer to an ID location than to an OD location. The next data strip in the first data stripe is indicated with an arrow to B0 which is stored on DSD 104 at an ID location. The first data stripe continues with data strip C0 stored on DSD 106 at an OD location and proceeds to D0 on DSD 108 and to E0 on DSD 110.

As with the data stripes of FIG. 4, the data stripes of FIG. 6 each have the same mix of different sized data strips for different radial locations. As a result, the data transfer rates for each data stripe are generally the same at 664 MB/s with the same total stripe width of 470 KB.

Figure 7:
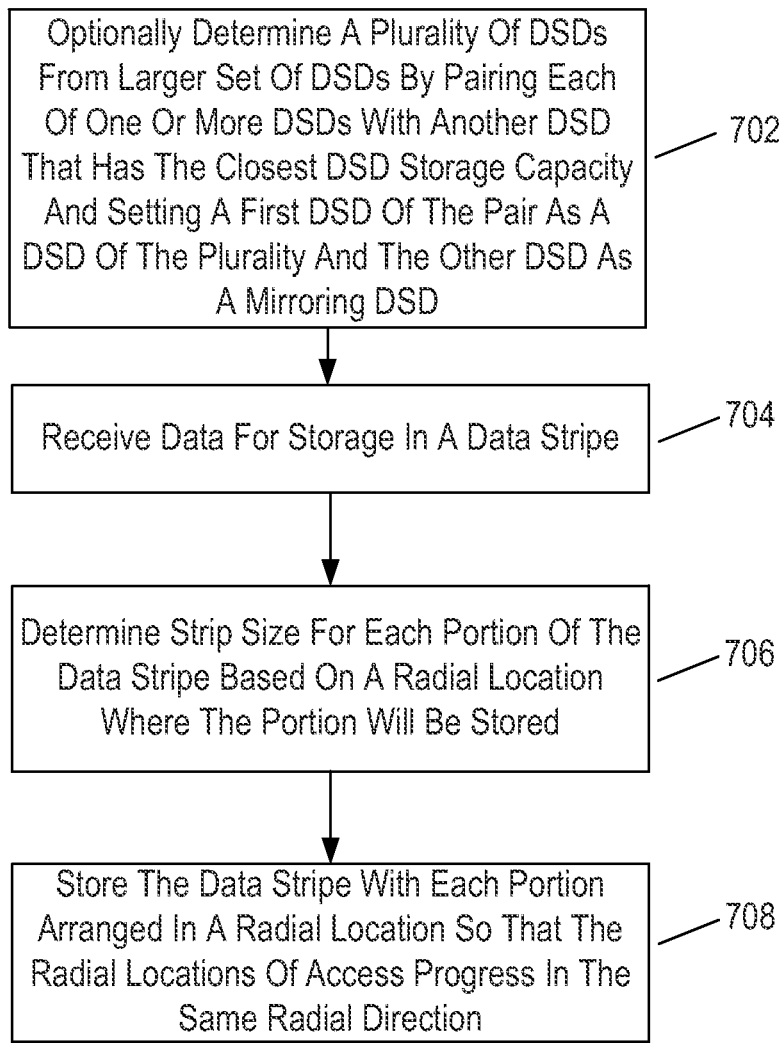
FIG. 7 is a flowchart for a data stripe storage process according to an embodiment.

FIG. 7 is a flowchart for a data stripe storage process that can be performed by processor 107 of RAID controller 101 by executing RAID application 10 according to an embodiment. Block 702 can be performed by processor 107 in an implementation where mirroring is used to store a copy of data stored on a mirrored DSD. In implementations where mirroring is not used, block 702 may be omitted.

Figure 8:
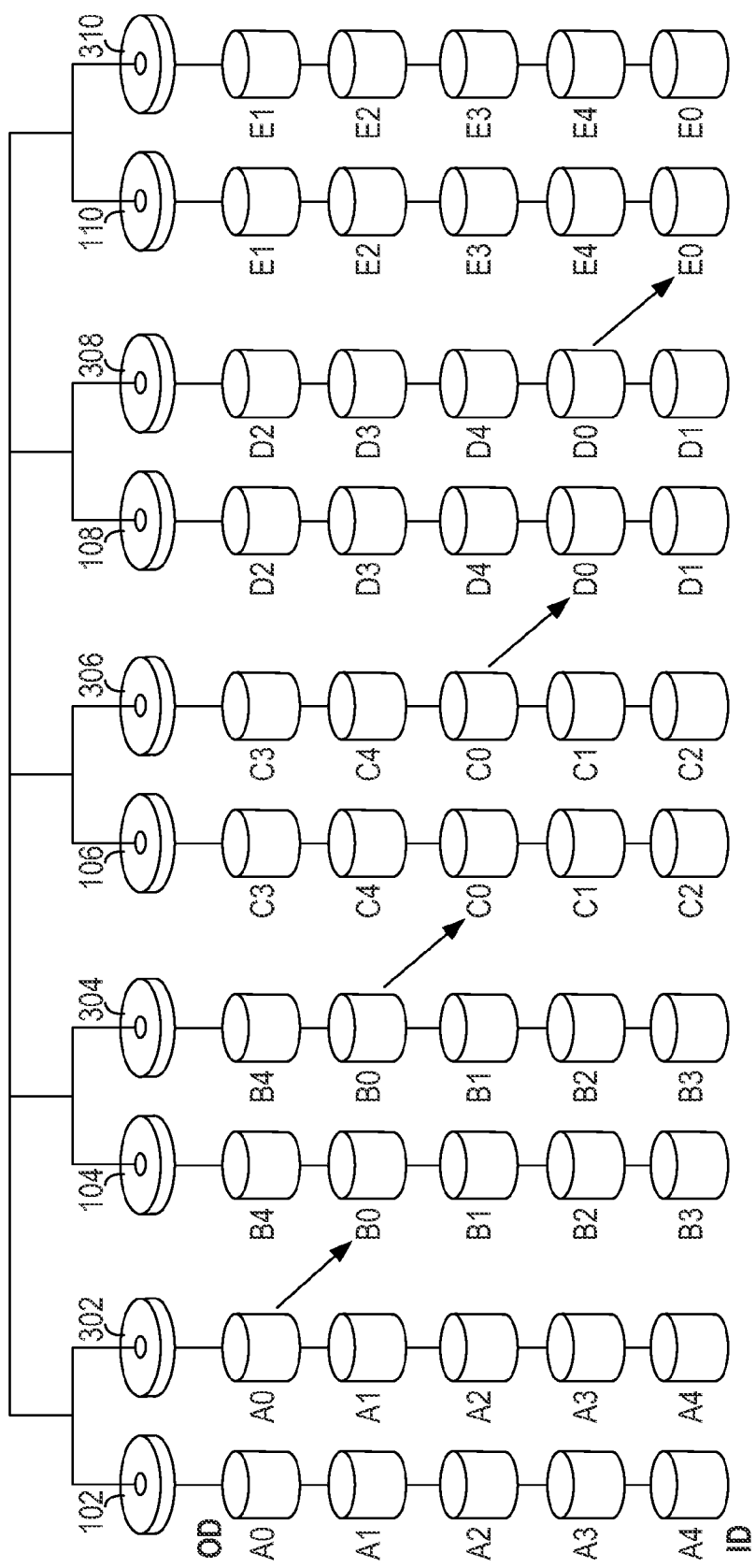
FIG. 8 is a conceptual diagram providing an example mirroring arrangement according to an embodiment.

FIG. 8 provides an example mirroring arrangement based on the example of FIG. 4. As shown in FIG. 8, a first data stripe includes data strips A0, B0, C0, D0, and E0 stored on DSDs 102, 104, 106, 108, and 110, respectively. A copy of each of these data strips is stored on DSDs 302, 304, 306, 308, and 310, respectively. Each of the copies of the data strips are stored at approximately the same radial location as where the original data strip is stored on the mirrored DSD. For example, if portion A0 is stored at an OD location of DSD 102 as shown in FIG. 8, a copy of A0 is also stored at an OD location of DSD 302 to provide for the same data transfer rate.

In addition to providing for redundancy, a mirroring arrangement can also ordinarily improve system performance in performing read and write commands as discussed in more detail below with reference to the processes of FIGS. 9 and 10. In other embodiments, not all of the DSDs may be paired with another DSD. For example, in one embodiment, only DSDs having less than a certain threshold data storage capacity may be paired together for redundancy to reduce the impact on an overall storage capacity of the system when compared to mirroring each DSD in the system.

Returning to the process of FIG. 7, processor 107 in block 702 optionally determines a plurality of DSDs from a larger set of DSDs by pairing DSDs that have the closest storage capacity to each other. This can be performed as part of an initialization of data storage system 100 to set up a mirroring arrangement as shown in the example of FIG. 8. In pairing the DSDs for mirroring, the storage capacity that is considered is the storage capacity that is available for storing data strips. In some implementations, this may not include the full storage capacity of the DSD, but rather, only a storage capacity of the DSD that is available for storing data strips.

By pairing DSDs by similar storage capacity, it is ordinarily possible to make better use of the storage capacity available across data storage system 100 since the amount of data that can be stored on a particular DSD is generally limited by the smaller capacity of the mirrored DSD and the mirroring DSD where the copied data strips are stored.

In block 704, processor 107 receives data via host interface 103 for storage in a data stripe. In block 706, processor 107 determines strip sizes for each portion of the data stripe based on a radial location where the portion will be stored. In determining the strip sizes, processor 107 may use stripe table 12 which can provide starting addresses for the different data strips. As discussed above with reference to FIGS. 4 to 5B, the strip sizes will vary depending on the radial locations where the data strip is stored.

In block 708, processor 107 via DSD interface 105 stores the data stripe with each portion or data strip arranged in a radial location so that the radial locations of access progress in the same radial direction. As noted above, arranging the data strips in this way can ordinarily reduce the amount of reverse seeking in the opposite radial direction and take better advantage of a track skew where tracks are circumferentially offset so as not to miss the beginning of a next track as a head travels from one track to the next. In addition, each data strip of the data stripe has the size determined in block 706, which is based on its radial location. In implementations where DSDs are mirrored, processor 107 also stores a copy of the data strip on a mirroring DSD at approximately the same radial location where the original portion is stored on the mirrored DSD.

Figure 9:
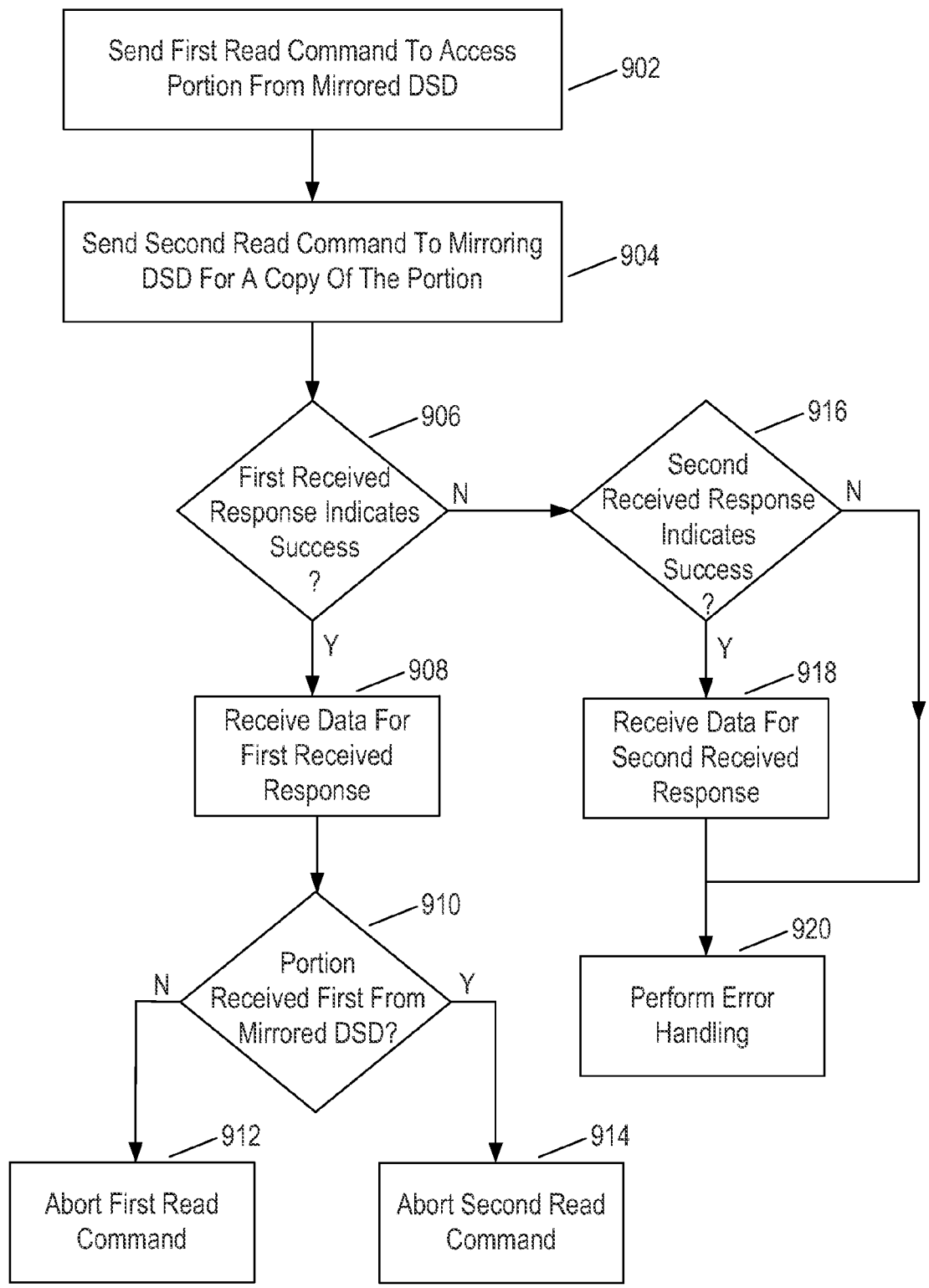
FIG. 9 is a flowchart for a read process for a data storage system with mirroring according to an embodiment.

FIG. 9 is a flowchart for a read process for a data storage system with mirroring where the mirroring can be used to shorten the time for performing a read command to read a data strip. The process of FIG. 9 can be performed by processor 107 executing RAID application 10 according to an embodiment.

In block 902, processor 107 sends a first read command to access a portion of a data stripe from a mirrored DSD such as DSD 102 in FIG. 8. The read command sent in block 902 can form part of multiple read commands sent to each of DSDs 102, 104, 106, 108, and 110 to read a full data stripe.

In block 904, processor 107 sends a second read command to a mirroring DSD to access a copy of the portion requested in block 902. With reference to the example of FIG. 8, if the first read command is sent to DSD 102 for the original data strip A0, processor 107 can send a second read command to DSD 302 in block 904 to read the copy of data strip A0 stored on DSD 302.

In block 906, after waiting for a response from either the mirrored DSD (e.g., DSD 102) or the mirroring DSD (e.g., DSD 302), processor 107 receives a first response and determines whether the first response indicates successful completion of the read command. If so, data is received for the first response in block 908. In block 910, processor 107 determines whether the data strip was first received from the mirrored DSD (e.g., DSD 102) or whether the copy of the data strip was first received from the mirroring DSD (e.g., DSD 302). If the data strip was first received from the mirrored DSD, processor 107 aborts the second read command sent to the mirroring DSD in block 914. On the other hand, if the copy of the data strip was received first, processor 107 aborts the first read command sent to the mirrored DSD in block 912.

By sending read commands to each of the mirrored DSD and the mirroring DSD, it is ordinarily possible to shorten the time it takes to receive the requested portion. Even though the original portion and the copied portion are located in approximately the same radial location, the respective disks of the mirrored DSD and the mirroring DSD may be at different points in their rotation such that one of the two DSDs can read the requested data strip before the other. In some implementations, the spinning of the disks of the mirroring and mirrored DSDs may also be synchronized so that they are rotationally out of phase with each other by 180 degrees so that the requested data strip can be accessed by at least one of the DSDs within half a disk revolution.

Returning to FIG. 9, if the first received response in block 906 does not indicate successful completion of a read command, processor 107 in block 916 after determines whether a second received response in block 916 indicates successful completion of the other read command. If not, the process proceeds to block 920 to perform error handling for both the mirrored DSD and the mirroring DSD. Examples of such error handling can include, for example, a read retry or a media test for the DSD.

On the other hand, if processor 107 determines that the second received response in block 916 indicates successful completion of a read command, processor 107 in block 918 receives data for the second received response which can include the data strip or a copy of the data strip. The process then proceeds to block 920 to perform error handling for the DSD corresponding to the unsuccessful first response received in block 906.

By sending read commands to each of the mirrored DSD and the mirroring DSD, it is ordinarily possible to obtain the requested data strip despite an error in performing a read command at one of the mirrored DSD or the mirroring DSD. This redundancy reduces the likelihood that access to a data stripe will be hindered by an error in reading a portion of the data stripe. The error handling of block 920 for the DSD with the failed read command can then be performed as background activity.

Figure 10:
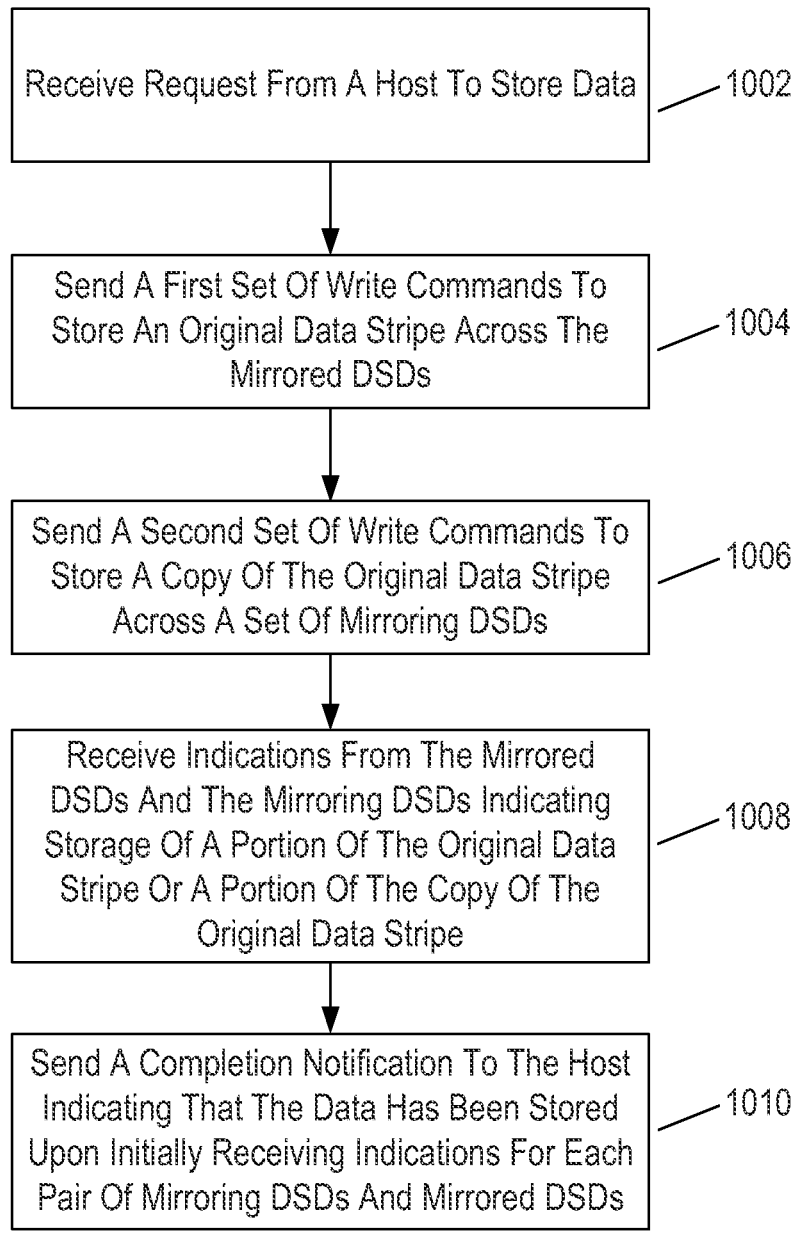
FIG. 10 is a flowchart for a write process for a data storage system with mirroring according to an embodiment.

FIG. 10 is a flowchart for a write process for a data storage system with mirroring where the mirroring can be used to shorten the time for indicating the completion of a write command to a host. By indicating the completion of a write command sooner, it may be possible to improve an overall system performance when the host may be waiting for the completion of the write command before proceeding to a next command or other action. The process of FIG. 10 can be performed by processor 107 executing RAID application 10 according to an embodiment.

In block 1002, processor 107 receives a request from host 200 via host interface 103 to store data in data storage system 100. The data can include data to be stored in a data stripe across the DSDs of data storage system 100.

In block 1004, processor 107 sends a first set of write commands via DSD interface 105 to store an original data stripe across mirrored DSDs in data storage system 100, such as DSDs 102, 104, 106, 108, and 110 in FIG. 8.

In block 1006, processor 107 sends a second set of write commands via DSD interface 105 to store a copy of the original data stripe across a set of mirroring DSDs, such as DSDs 302, 304, 306, 308, and 310 in FIG. 8. As in the example of FIG. 8, each of the mirroring DSDs is paired with a corresponding mirrored DSD to store a copy of data stored on the corresponding mirrored DSD.

In block 1008, processor 107 receives indications from the mirrored and mirroring DSDs indicating the storage of portions of the original data stripe or portions of the copy of the original data stripe. Each of the mirrored DSDs and the mirroring DSDs may send a notification such as a command completion indication back to RAID controller 101.

In block 1010, processor 107 sends a completion notification to host 200 indicating that the data has been stored upon initially receiving indications for each pair of mirroring DSDs and corresponding mirrored DSDs. Processor 107 may keep track in memory 109 of whether a notification has been received for each pair of DSDs and then send the completion notification to host 200 in block 1010 upon initially receiving notifications from all of the pairs of DSDs.

By sending a completion notification to host 200 upon initially receiving notifications for each pair of DSDs, it is ordinarily possible for processor 107 to send the completion notification to host 200 sooner than if processor 107 had to wait to receive all notifications from every mirrored and mirroring DSD. Even though the original portion and the copied portion are located in the same radial location, the respective disks of the mirrored DSD and the mirroring DSD may be at different points in their rotation such that one of the two DSDs can write its portion of the data stripe before the other. In some implementations, the spinning of the disks of the mirroring and mirrored DSDs may also be synchronized so that they are rotationally out of phase with each other by 180 degrees so that each data strip or its copy can be written in either the mirroring DSD or the mirrored DSD within half a disk revolution.

Variable Capacity Data Striping Examples

Figure 11:
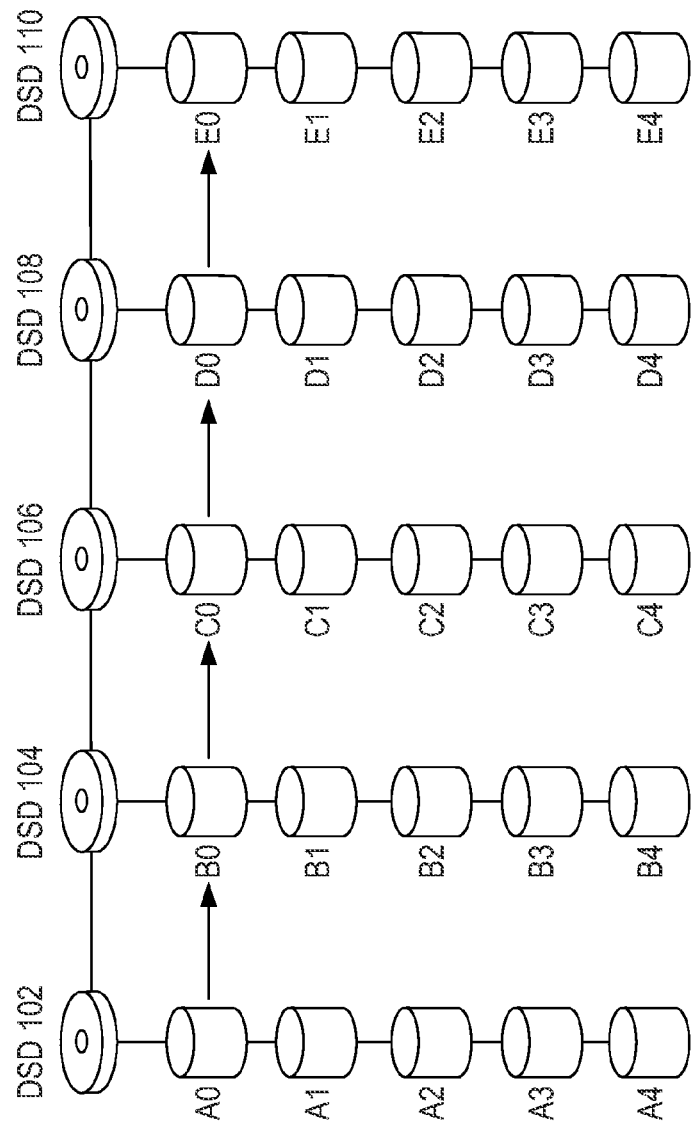
FIG. 11 is a conceptual diagram providing an example of a data storage system including DSDs with varying data storage capacities according to an embodiment.

FIG. 11 is a conceptual diagram providing an example of a data storage system including DSDs with varying data storage capacities according to an embodiment. Oftentimes, DSDs will have slightly different actual data storage capacities due to variations during manufacturing even if the DSDs were intended to have the same data storage capacity. Using a fixed or static data strip size as in the example of FIG. 4, generally does not make full use of the actual data storage capacity on each DSD since all of the DSDs in such a configuration will be limited to the smallest data storage capacity among the DSDs.

The following embodiments therefore provide for data strips of varying size based on the amount of storage capacity contributed by the DSD storing the data strip to a total storage capacity of the data storage system. This arrangement ordinarily allows for a more efficient use of the total storage capacity of the DSDs.

As shown in the example of FIG. 11, data storage system 100 provides a total data storage capacity of 26.2 TB with DSD 102 contributing 5.1 TB, DSD 104 contributing 5.5 TB, DSD 106 contributing 4.9 TB, DSD 108 contributing 5.3 TB, and DSD 110 contributing 5.4 TB. The contribution amount of each DSD can be the entire storage capacity of the DSD, or in some cases, a portion of its storage capacity that has been made available for storing data strips. In the example of FIG. 11, a weight is determined for each DSD based on a percentage of the total storage capacity that is contributed by the DSD. As shown in FIG. 11, DSD 108 contributes the most with a weight of 20.9% and DSD 106 contributes the least with a weight of 18.7%. The storage capacity for the DSDs may be based on using different types of NVM media such as a rotating magnetic disk and/or a solid state memory.

The strip sizes assigned to each DSD are based at least in part on the portion of the total storage capacity that is contributed by the respective DSD's storage capacity. In the example of FIG. 11, a total stripe width of 512 KB is used and each DSD's strip size is the product of the DSD's weight and the total stripe width. For example, the strip size assigned to DSD 106 is its weight of 18.7% multiplied by the total stripe width of 512 KB to yield a strip size for DSD 106 of 96 KB. In other embodiments, the assigned strip size may be determined by also considering other factors in addition to its storage capacity contribution, such as a performance level of the DSD or a level of reliability of the DSD.

Figure 12:
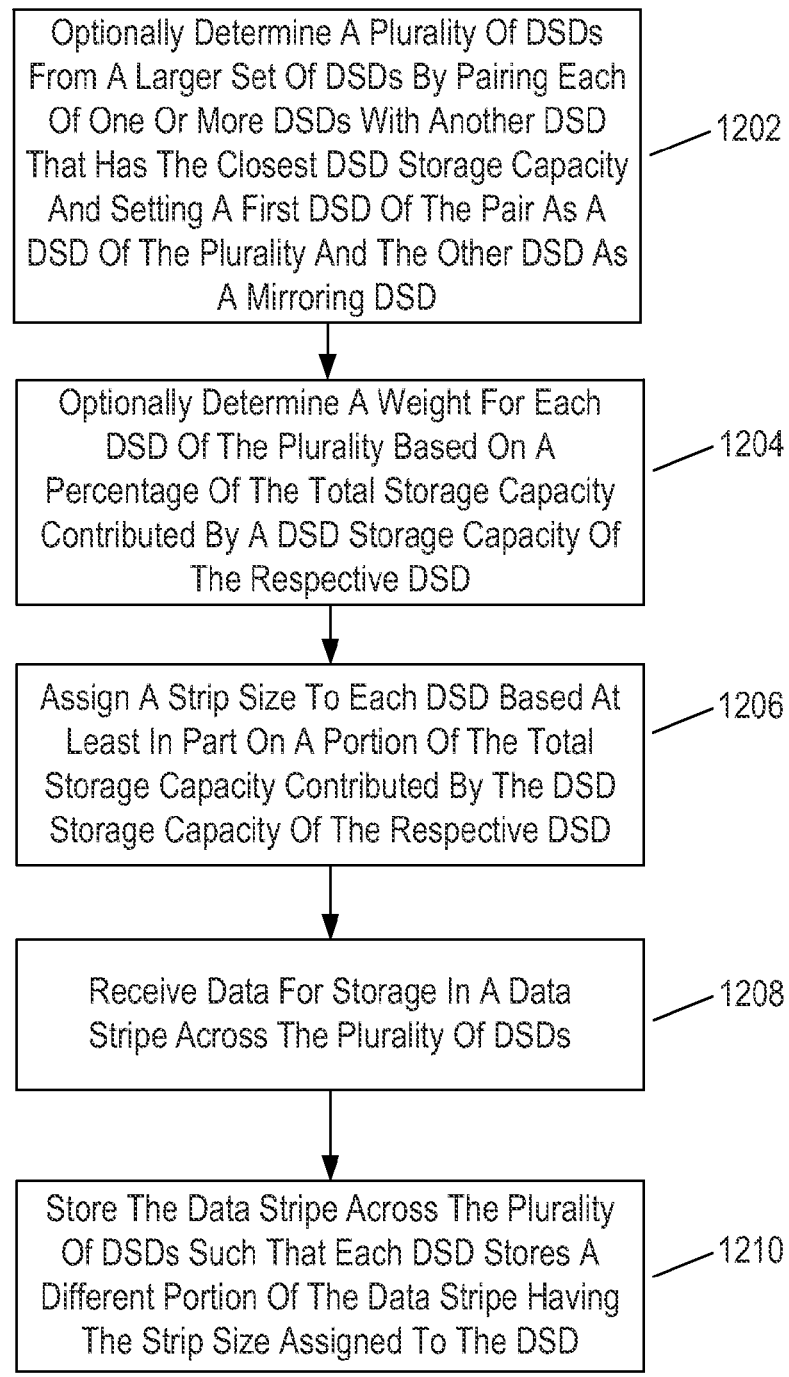
FIG. 12 is a flowchart for a data stripe storage process for DSDs with varying data storage capacities according to an embodiment.

FIG. 12 is a flowchart for a data stripe storage process for DSDs with varying data storage capacities according to an embodiment. The process of FIG. 12 can be performed by processor 107 of RAID controller 101 executing RAID application 10 according to an embodiment.

Block 1202 can be performed by processor 107 in an implementation where mirroring is used to store a copy of data stored on a mirrored DSD. In implementations where mirroring is not used, block 1202 may be omitted. In block 1202, processor 107 optionally determines a plurality of DSDs from a larger set of DSDs by pairing DSDs that have the closest storage capacity to each other. This can be performed as part of an initialization of data storage system 100 to set up a mirroring arrangement as shown in the example of FIG. 8. In pairing the DSDs for mirroring, the storage capacity that is considered is the storage capacity that is available for storing data strips. In some implementations, this may not include the full storage capacity of the DSD, but rather, only a storage capacity of the DSD that is available for storing data strips.

By pairing DSDs with similar storage capacity, it is ordinarily possible to make better use of the storage capacity available across data storage system 100 since the amount of data that can be stored on a particular DSD is generally limited by the smaller capacity between the mirrored DSD and the mirroring DSD where the copied data strips are stored.

In block 1204, processor 107 optionally determines a weight for each DSD of the plurality of DSDs based on a percentage of the total storage capacity contributed by the DSD. As in the example of FIG. 11, the individual contribution of each DSD can be divided by a total storage capacity for all of the DSDs to determine the weight for each DSD. In other embodiments, the weight for each DSD may be determined differently such as by assigning predetermined weights for each DSD based on whether the contribution of the DSD falls within a certain storage capacity range.

In block 1206, processor 107 assigns a strip size to each DSD in data storage system 100 based at least in part on a portion of the total storage capacity contributed by the DSD storage capacity of the respective DSD. In an implementation where mirroring is used, processor 107 determines the contribution for each mirrored DSD using the storage capacity of its respective mirroring DSD if the storage capacity of the mirroring DSD is less than the storage capacity of the mirrored DSD.

The strip size can be based on a weight determined in block 1204 or can be assigned based on whether the storage capacity of the DSD exceeds a certain threshold. In one implementation, the strip size can be assigned based on whether the DSD's storage capacity is less than or greater than an average DSD storage capacity for the DSDs in data storage system 100. In some implementations, other factors such as a performance of a particular DSD or a reliability of the DSD may also be considered in assigning a strip size to the DSD. Processor 107 can establish or update the address ranges for stripe table 12 to reflect the strip sizes assigned to each DSD and/or store strip sizes for the DSDs in memory 109 as strip sizes 13.

In block 1208, processor 107 receives data via host interface 103 for storage in a data stripe across DSDs 102, 104, 106, and 108. The data is then stored in a data stripe in block 1210 with each DSD having the strip size assigned in block 1206. In storing the data, processor 107 may divide the received data into data strips using stripe table 12 or strip sizes 13 and send write commands for the data strips to the DSDs via DSD interface 105.

FIG. 13 is a table illustrating the determination of different weights for different DSDs as DSDs are removed, replaced, or added according to an embodiment. At an initial point in time represented by the first row in the table of FIG. 13, data storage system 100 includes five DSDs for storing data stripes. Each of the initial DSDs including DSDs 102, 104, 106, 108, and 110 are assigned a strip size based on their respective contributions to the total data storage capacity. The initial total data storage capacity is the sum of the storage capacities of DSDs 102, 104, 106, 108, and 110, or 26.2 TB. The weight shown in the first row of the table is then the storage capacity for that particular DSD divided by the total storage capacity of 26.2 TB.

In the second row, DSD 110 has been removed and is no longer available for storing new data stripes. In some cases, the removal of DSD 110 can be due to a failure of DSD 110. In other cases, the removal of DSD 110 can be due to DSD 110 reaching its capacity for storing data strips. The remaining DSDs (i.e., DSDs 102, 104, 106, and 108) are reassigned larger strip sizes to make up for the storage capacity lost by removing DSD 110. This is shown in the example of FIG. 13 with the recalculated weights for DSDs 102, 104, 106, and 108.

As shown in FIG. 13, the removal of DSD 110 occurs at a stripe crossover point of the third data stripe of data stripe 2. In a case where DSD 110 is to be completely removed from the system, the data from the first two data stripes (i.e., data stripes 0 and 1) can be redistributed or reorganized among the remaining DSDs using the new strip sizes assigned to the remaining DSDs. In a case where DSD 110 is still available for accessing data from the first two data stripes, such as when DSD 110 has reached its available data storage capacity, the first two data stripes can have the strip sizes corresponding to the first row weights. The data stripes following the first two data stripes would then have the new strip sizes shown in the second row after the stripe crossover point of the third data stripe of data stripe 2. After this point, the strip size assigned to DSD 110 in strip sizes 13 can be set to 0 so that no new data strips are stored on DSD 110 after the first stripe crossover point.

After the fourth data stripe (i.e., data stripe 3), a new DSD 112 is added to replace the lost capacity of DSD 110. In the example of FIG. 13, replacement DSD 112 has a larger storage capacity than replaced DSD 110 (5.6 TB versus the replaced storage capacity of 5.4 TB). A new strip size is assigned to each of DSDs 102, 104, 106, 108, and 112 reflecting the changes in total storage capacity and the relative contributions of each DSD to the total storage capacity. The new strip sizes can be added to strip sizes 13 for each of DSDs 102, 104, 106, 108, and 112.

In the fourth row, or at the stripe crossover point of the fifth data stripe 4, three new DSDs are added to data storage system 100 to increase the number of DSDs. The data stripes up to and including the stripe crossover point of data stripe 4 will have data strip sizes based on the previous weight or weights for the DSDs. After the third stripe crossover point, only the new DSDs 114, 116, and 118 are used for storing new data stripes. The strip sizes for the new DSDs are based on the new total storage capacity of the new DSDs their respective contributions to the new total storage capacity. Strip sizes 13 in memory 109 can be modified to add the strip sizes for the new DSDs and to set the strip sizes for the old DSDs to 0 after the third stripe crossover point of data stripe 4.

The use of the stripe crossover point allows for the old DSDs to continue to be used for the data stripes up to the stripe crossover point while adding new DSDs to data storage system 100. This can ordinarily allow for new DSDs to be added without having to rebuild or redistribute the data stripes before the stripe crossover point.

By dynamically adjusting the strip sizes, it is also possible to prolong the usable life of data storage system 100 by allowing for the replacement of DSDs that may have failed or reached their capacity without having to rebuild all of the data stripes, which can consume system resources and take a significant amount of time. The changes in the strip sizes over time can lead to different versions of stripe table 12 that are used depending on a data stripe's placement in relation to one or more stripe crossover points. In addition, and as discussed above, RAID controller 101 may store multiple strip sizes in strip sizes 13 for each DSD reflecting the strip sizes at different stripe crossover points.

Figure 14:
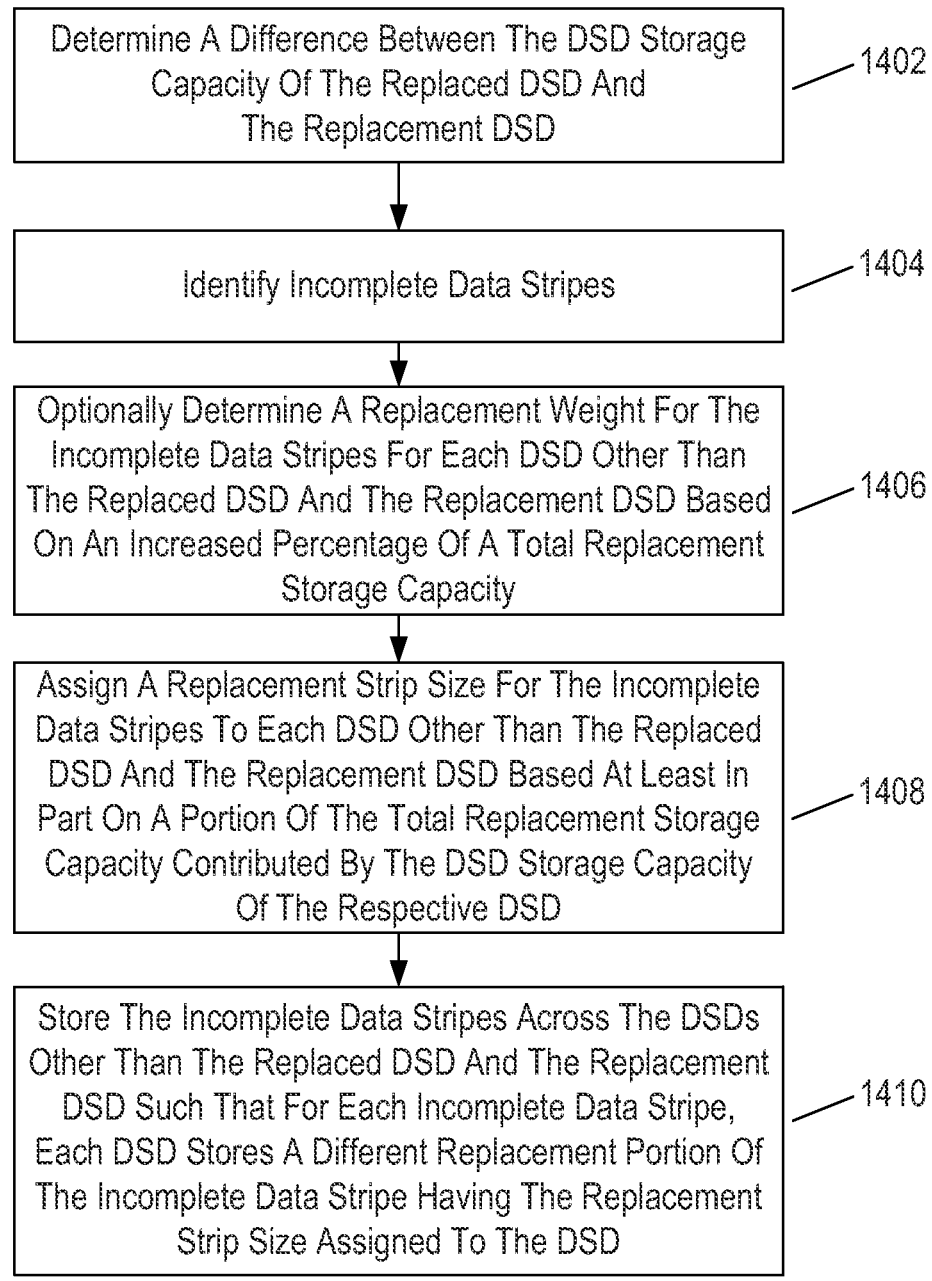
FIG. 14 is a flowchart for a DSD replacement process according to an embodiment.

FIG. 14 is a flowchart for a DSD replacement process according to an embodiment where the replacement DSD has a smaller DSD storage capacity than the DSD that was replaced and not all of the data strips stored on the replaced DSD fit onto the replacement DSD. In other situations where the available storage capacity on the replacement DSD is large enough to accommodate all of the data strips of the replaced DSD, the data stored on the replaced DSD can be copied from a mirroring DSD or from an external source onto the replacement DSD. In other embodiments, the largest DSD from a set of DSDs to be used in the system can be set aside or reserved as a replacement DSD to ensure that the replacement DSD can accommodate all of the data strips of a replaced DSD. In contrast, the process of FIG. 14 allows for the use of unused capacity on the remaining DSDs without having to add a replacement DSD with an equal or larger capacity than the replaced DSD.

The process of FIG. 14 can be performed by processor 107 executing RAID application 10 according to an embodiment. In block 1402, processor 107 determines a difference between the DSD storage capacity of the replaced DSD and the DSD storage capacity of the replacement DSD. For example, if the replaced DSD had a storage capacity of 5.4 TB and the replacement DSD has a storage capacity of 5.0 TB, the difference determined in block 1402 would be 0.4 TB.

In block 1404, processor 107 identifies incomplete data stripes due to the smaller storage capacity of the replacement DSD. In cases where the replacement DSD can store all of the data strips of the replaced DSD, there will be no incomplete data stripes and the process of FIG. 14 need not be performed.

In one implementation, processor 107 in block 1404 can identify the incomplete data stripes by dividing the difference in storage capacity determined in block 1402 by the data size used for each data stripe and then subtracting this value from the total number of data stripes stored in data storage system 100. This difference provides a stripe crossover point where any data stripes beyond the stripe crossover point will be incomplete due to the smaller size of the replacement DSD.

In block 1406, processor 107 optionally determines a replacement weight for the incomplete data stripes for each DSD other than the replaced DSD and the replacement DSD. The replacement weight is based on an increased percentage of a total replacement storage capacity equal to the sum of the storage capacities of the DSDs other than the replaced DSD and the replacement DSD.

In block 1410, the incomplete data stripes are stored across the DSDs other than the replaced DSD and the replacement DSD such that for each incomplete data stripe, each DSD stores a different replacement portion of the incomplete data stripe having the replacement strip size assigned to the DSD. In this way, it is ordinarily possible to use space available on other DSDs to store data strips of the incomplete data stripes. Processor 107 may assign the replacement DSD a strip size of 0 for data stripes after the stripe crossover point so that new data stripes are not stored on the replacement DSD, which will have reached its available storage capacity by storing data strips from the replaced DSD.

The process of FIG. 14 assumes that there is enough available space remaining on the other DSDs to store the incomplete data stripes and still provide for any workspace overhead that may be needed, such as for a file system. After the incomplete data stripes have been stored, the replacement strip sizes may also be used to store new data stripes across the DSDs other than the replaced DSD and the replacement DSD.

Figure 15:
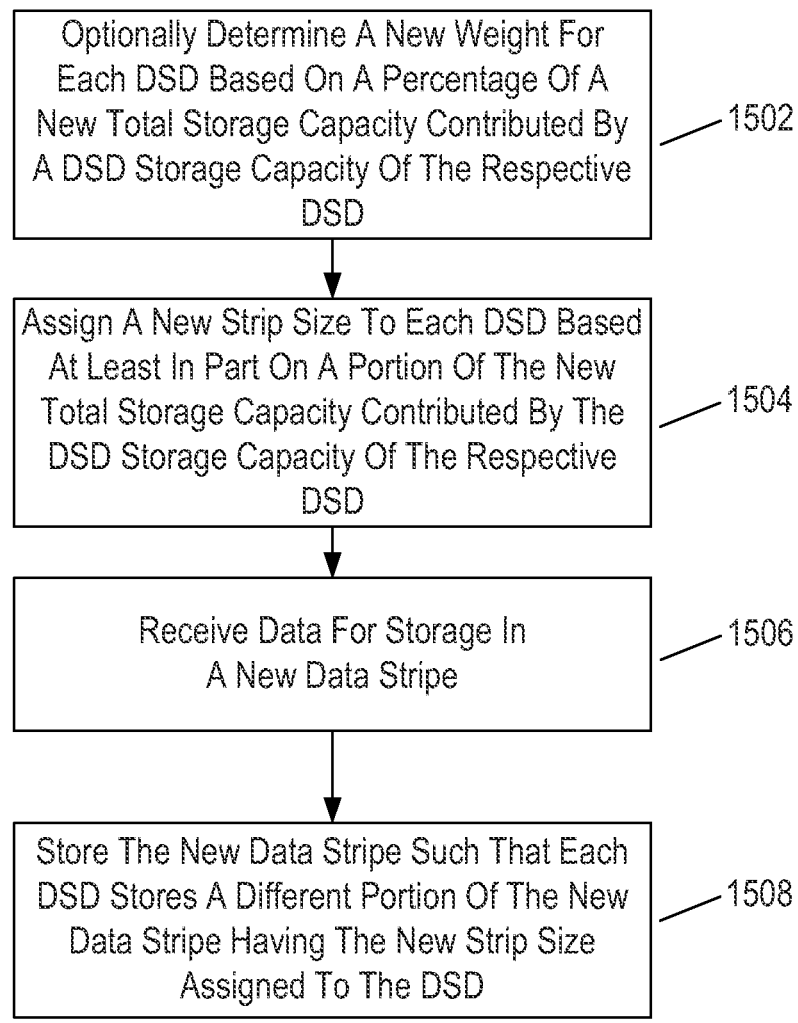
FIG. 15 is a flowchart for a DSD addition process according to an embodiment.

FIG. 15 is a flowchart for a DSD addition process according to an embodiment. The process of FIG. 15 can be used in cases where a replacement DSD has an available storage capacity greater than or equal to the available storage capacity of a replaced DSD or when increasing the number of DSDs in data storage system 100. In some embodiments, the process of FIG. 15 can be performed by processor 107 executing RAID application 10.

In block 1502, processor 107 optionally determines a new weight for each DSD based on a percentage of a new total storage capacity contributed by each DSD. In the case where a replacement DSD is replacing a replaced DSD, such as in the third row of FIG. 13, a new weight for each DSD can be determined by dividing the individual contribution of each DSD by the new total storage capacity (e.g., the sum of the storage capacities of DSDs 102, 104, 106, 108, and 112 in FIG. 13). In the case where one or more new DSDs are added to data storage system 100 to increase the number of DSDs, the available storage capacities of the new DSDs form the new total storage capacity and each of the new DSDs is assigned a new weight based on its contribution to the new total storage capacity. The old DSDs may then be assigned a new weight of 0 so that new data stripes (i.e., after a stripe crossover point) are not stored on the old DSDs.

In block 1504, processor 107 assigns a new strip size to each DSD based at least in part on a portion of the new total storage capacity contributed by the DSD. The strip size can be based on a weight determined in block 1504 or can be assigned based on whether the storage capacity of the DSD exceeds a certain threshold. In one implementation, the strip size can be assigned based on whether the DSD's storage capacity is less than or greater than an average DSD storage capacity for the DSDs in data storage system 100. In some implementations, other factors such as a performance of a particular DSD or a reliability of the DSD may also be considered in assigning a strip size to the DSD. Processor 107 can update the address ranges for stripe table 12 to reflect the new strip sizes assigned to each DSD in block 1504 and/or store the new strip sizes for each DSD in strip sizes 13 in memory 109.

In block 1506, processor 107 receives data via host interface 103 for storage in a new data stripe. In block 1508, processor 107 via DSD interface 105 stores the new data stripe such that each DSD stores a different portion of the new data stripe having the new strip size assigned to the DSD. As part of storing the new data stripe, processor 107 may use stripe table 12 which can provide starting addresses for the data strips of the new data stripe or may use the new strip sizes stored in strip sizes 13 for each DSD.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage system, comprising:
    a plurality of Data Storage Devices (DSDs) having a total storage capacity available for storing user data among the plurality of DSDs with each DSD of the plurality of DSDs having a DSD storage capacity that contributes to the total storage capacity of the plurality of DSDs; and
    a controller configured to:
        in response to one of the plurality of DSDs being replaced by a replacement DSD having a DSD storage capacity greater than the DSD storage capacity of the replaced DSD:
            assign a new strip size to each DSD of the plurality of DSDs including the replacement DSD based at least in part on a portion of a new total storage capacity for the plurality of DSDs that is contributed by the DSD storage capacity of the respective DSD;
        receive data for storage in a new data stripe; and
        store the new data stripe across the plurality of DSDs including the replacement DSD such that each DSD stores a different portion of the new data stripe having the new strip size assigned to the DSD.

2. The data storage system of claim 1, further comprising at least one mirroring DSD for storing a copy of data stored on a respective mirrored DSD of the plurality of DSDs, wherein the controller is further configured to store a copy of a portion of a data stripe on a mirroring DSD of the least one mirroring DSD such that the copy of the portion is stored at approximately the same radial location where the portion is stored on a disk of the mirrored DSD of the plurality of DSDs.

3. The data storage system of claim 2, wherein the controller is further configured to:
    send a first read command to access a portion of the data stripe from a mirrored DSD of the plurality of DSDs;
    send a second read command to a mirroring DSD of the at least one mirroring DSD storing a copy of the portion stored on the mirrored DSD;
    initially receive one of the portion from the mirrored DSD or the copy of the portion from the mirroring DSD;
    abort the first read command if the copy of the portion is initially received from the mirroring DSD; and
    abort the second read command if the portion is initially received from the mirrored DSD.

4. The data storage system of claim 2, wherein the controller is further configured to:
    receive a request from a host to store data in the data storage system;
    send a first set of write commands to the plurality of DSDs to store an original data stripe for the data across the plurality of DSDs;
    send a second set of write commands to a set of mirroring DSDs to store a copy of the original data stripe across the set of mirroring DSDs, wherein each mirroring DSD in the set of mirroring DSDs is paired with a corresponding DSD of the plurality of DSDs to store a copy of data stored in the corresponding DSD;
    receive indications from the plurality of DSDs and the set of mirroring DSDs indicating the storage of a portion of the original data stripe or a portion of the copy of the original data stripe; and
    send a completion notification to the host indicating that the data has been stored in the data storage system upon initially receiving indications for each pair of mirroring DSDs and corresponding DSDs of the plurality of DSDs.

5. The data storage system of claim 1, wherein the controller includes a memory, and wherein the controller is further configured to store at least one address in the memory for each portion of the new data stripe to identify the portion and to associate the portion with the DSD storing the portion.

6. The data storage system of claim 1, wherein the plurality of DSDs stores a plurality of data stripes across the plurality of DSDs and the controller includes a memory, and wherein the controller is further configured to store a starting address in the memory for each data stripe to indicate a beginning location of the data stripe with the starting address for each data stripe after a first data stripe being offset from a previous starting address for a previous data stripe by a predetermined address offset based on the number of data stripes in the plurality of data stripes.

7. The data storage system of claim 1, wherein the data stripe includes a stream of video data or logging data.

8. The data storage system of claim 1, wherein the controller is further configured to determine the plurality of DSDs from a larger set of DSDs by:
    pairing each of one or more DSDs of the larger set with another DSD of the larger set that has the closest DSD storage capacity available for storing user data; and
    for each pair of DSDs, setting a first DSD of the pair as a DSD of the plurality of DSDs and setting the other DSD of the pair as a mirroring DSD for storing a copy of user data stored on the first DSD.

9. A method of operating a data storage system including a plurality of Data Storage Devices (DSDs) having a total storage capacity available for storing user data among the plurality of DSDs with each DSD of the plurality of DSDs having a DSD storage capacity that contributes to the total storage capacity of the plurality of DSDs, the method comprising:
    in response to one of the plurality of DSDs being replaced by a replacement DSD having a DSD storage capacity greater than the DSD storage capacity of the replaced DSD:
        assigning a new strip size to each DSD of the plurality of DSDs including the replacement DSD based at least in part on a portion of a new total storage capacity for the plurality of DSDs that is contributed by the DSD storage capacity of the respective DSD;

receiving data for storage in a new data stripe; and storing the new data stripe across the plurality of DSDs including the replacement DSD such that each DSD stores a different portion of the new data stripe having the new strip size assigned to the DSD.

10. The method of claim 9, wherein the data storage system further includes at least one mirroring DSD for storing a copy of data stored on a respective mirrored DSD of the plurality of DSDs, and wherein the method further comprises storing a copy of a portion of a data stripe on a mirroring DSD of the least one mirroring DSD such that the copy of the portion is stored at approximately the same radial location where the portion is stored on a disk of the mirrored DSD of the plurality of DSDs.

11. The method of claim 10, further comprising:

sending a first read command to access a portion of the data stripe from a mirrored DSD of the plurality of DSDs;

sending a second read command to a mirroring DSD of the at least one mirroring DSD storing a copy of the portion stored on the mirrored DSD;

initially receiving one of the portion from the mirrored DSD or the copy of the portion from the mirroring DSD;

aborting the first read command if the copy of the portion is initially received from the mirroring DSD; and aborting the second read command if the portion is initially received from the mirrored DSD.

12. The method of claim 10, further comprising:

receiving a request from a host to store data in the data storage system;

sending a first set of write commands to the plurality of DSDs to store an original data stripe for the data across the plurality of DSDs;

sending a second set of write commands to a set of mirroring DSDs to store a copy of the original data stripe across the set of mirroring DSDs, wherein each mirroring DSD in the set of mirroring DSDs is paired with a corresponding DSD of the plurality of DSDs to store a copy of data stored in the corresponding DSD;

receiving indications from the plurality of DSDs and the set of mirroring DSDs indicating the storage of a portion of the original data stripe or a portion of the copy of the original data stripe; and sending a completion notification to the host indicating that the data has been stored in the data storage system upon initially receiving indications for each pair of mirroring DSDs and corresponding DSDs of the plurality of DSDs.

13. The method of claim 9, further comprising storing at least one address in a memory for each portion of the new data stripe to identify the portion and to associate the portion with the DSD storing the portion.

14. The method of claim 9, wherein the plurality of DSDs stores a plurality of data stripes across the plurality of DSDs and the method further comprises storing a starting address in a memory for each data stripe to indicate a beginning location of the data stripe with the starting address for each data stripe after a first data stripe being offset from a previous starting address for a previous data stripe by a predetermined address offset based on the number of data stripes in the plurality of data stripes.

15. The method of claim 9, wherein the data stripe includes a stream of video data or logging data.

16. The method of claim 9, wherein the method further comprises determining the plurality of DSDs from a larger set of DSDs by:

pairing each of one or more DSDs of the larger set with another DSD of the larger set that has the closest DSD storage capacity available for storing user data; and for each pair of DSDs, setting a first DSD of the pair as a DSD of the plurality of DSDs and setting the other DSD of the pair as a mirroring DSD for storing a copy of user data stored on the first DSD.

17. A controller for a data storage system including a plurality of Data Storage Devices (DSDs) having a total storage capacity available for storing user data among the plurality of DSDs with each DSD of the plurality of DSDs having a DSD storage capacity that contributes to the total storage capacity of the plurality of DSDs, the controller comprising:

an interface for communicating with the plurality of DSDs; and a processor configured to:

in response to one of the plurality of DSDs being replaced by a replacement DSD having a DSD storage capacity greater than the DSD storage capacity of the replaced DSD:

assign a new strip size to each DSD of the plurality of DSDs including the replacement DSD based at least in part on a portion of a new total storage capacity for the plurality of DSDs that is contributed by the DSD storage capacity of the respective DSD;

receive data for storage in a new data stripe across the plurality of DSDs; and store the new data stripe across the plurality of DSDs including the replacement DSD such that each DSD stores a different portion of the new data stripe having the new strip size assigned to the DSD.

18. A data storage system, comprising:

a plurality of Data Storage Devices (DSDs) having a total storage capacity available for storing user data among the plurality of DSDs with each DSD of the plurality of DSDs having a DSD storage capacity that contributes to the total storage capacity of the plurality of DSDs; and a controller configured to:

store a plurality of data stripes across the plurality of DSDs; and in response to one of the plurality of DSDs being replaced by a replacement DSD having a DSD storage capacity less than the DSD storage capacity of the replaced DSD:

determine a difference between the DSD storage capacity of the replaced DSD and the DSD storage capacity of the replacement DSD, wherein the total storage capacity is reduced to a total replacement storage capacity for storing user data among the plurality of DSDs other than the replaced DSD and the replacement DSD;

identify incomplete data stripes of the plurality of data stripes that would be incomplete due to the smaller DSD storage capacity of the replacement DSD;

assign a replacement strip size for the incomplete data stripes to each DSD of the plurality of DSDs other than the replaced DSD and the replacement DSD, wherein the replacement strip size is based at least in part on a portion of the total replacement storage capacity that is contributed by the DSD storage capacity of the respective DSD; and store the incomplete data stripes across the plurality of DSDs other than the replaced DSD and the replacement DSD such that for each incomplete data stripe, each DSD stores a different replacement portion of the incomplete data stripe having the replacement strip size assigned to the DSD.

19. The data storage system of claim 18, wherein in identifying incomplete data stripes of the plurality of data stripes, the controller is further configured to determine the number of incomplete data stripes by dividing the difference between the DSD storage capacity of the replaced DSD and the DSD storage capacity of the replacement DSD by a data size for each of the plurality of data stripes.

20. A method of operating a data storage system including a plurality of Data Storage Devices (DSDs) having a total storage capacity available for storing user data among the plurality of DSDs with each DSD of the plurality of DSDs having a DSD storage capacity that contributes to the total storage capacity of the plurality of DSDs, the method comprising:
  storing a plurality of data stripes across the plurality of DSDs; and
  in response to one of the plurality of DSDs being replaced by a replacement DSD having a DSD storage capacity less than the DSD storage capacity of the replaced DSD:
    determining a difference between the DSD storage capacity of the replaced DSD and the DSD storage capacity of the replacement DSD, wherein the total storage capacity is reduced to a total replacement storage capacity for storing user data among the plurality of DSDs other than the replaced DSD and the replacement DSD;
    identifying incomplete data stripes of the plurality of data stripes that would be incomplete due to the smaller DSD storage capacity of the replacement DSD;
    assigning a replacement strip size for the incomplete data stripes to each DSD of the plurality of DSDs other than the replaced DSD and the replacement DSD, wherein the replacement strip size is based at least in part on a portion of the total replacement storage capacity that is contributed by the DSD storage capacity of the respective DSD; and
    storing the incomplete data stripes across the plurality of DSDs other than the replaced DSD and the replacement DSD such that for each incomplete data stripe, each DSD stores a different replacement portion of the incomplete data stripe having the replacement strip size assigned to the DSD.

21. The method of claim 20, wherein in identifying incomplete data stripes of the plurality of data stripes, the controller is further configured to determine the number of incomplete data stripes by dividing the difference between the DSD storage capacity of the replaced DSD and the DSD storage capacity of the replacement DSD by a data size for each of the plurality of data stripes.

22. A controller for a data storage system including a plurality of Data Storage Devices (DSDs) having a total storage capacity available for storing user data among the plurality of DSDs with each DSD of the plurality of DSDs having a DSD storage capacity that contributes to the total storage capacity of the plurality of DSDs, the controller comprising:
  an interface for communicating with the plurality of DSDs; and
  a processor configured to:
    store a plurality of data stripes across the plurality of DSDs; and
    in response to one of the plurality of DSDs being replaced by a replacement DSD having a DSD storage capacity less than the DSD storage capacity of the replaced DSD:
      determine a difference between the DSD storage capacity of the replaced DSD and the DSD storage capacity of the replacement DSD, wherein the total storage capacity is reduced to a total replacement storage capacity for storing user data among the plurality of DSDs other than the replaced DSD and the replacement DSD;
      identify incomplete data stripes of the plurality of data stripes that would be incomplete due to the smaller DSD storage capacity of the replacement DSD;
      assign a replacement strip size for the incomplete data stripes to each DSD of the plurality of DSDs other than the replaced DSD and the replacement DSD, wherein the replacement strip size is based at least in part on a portion of the total replacement storage capacity that is contributed by the DSD storage capacity of the respective DSD; and
      store the incomplete data stripes across the plurality of DSDs other than the replaced DSD and the replacement DSD such that for each incomplete data stripe, each DSD stores a different replacement portion of the incomplete data stripe having the replacement strip size assigned to the DSD.

23. The controller of claim 22, wherein in identifying incomplete data stripes of the plurality of data stripes, the processor is further configured to determine the number of incomplete data stripes by dividing the difference between the DSD storage capacity of the replaced DSD and the DSD storage capacity of the replacement DSD by a data size for each of the plurality of data stripes.

* * * * *